United States Patent Office 3,358,650
Patented Dec. 19, 1967

3,358,650
WATER COOLED FURNACE JOINT FOR MIXING HEADER ARRANGEMENT
Robert L. Olson, Thompsonville, and Edward L. Kochey, Jr., Colebrook, Conn., assignors to Combustion Engineering, Inc., Windsor, Conn., a corporation of Delaware
Filed Dec. 27, 1965, Ser. No. 516,566
7 Claims. (Cl. 122—6)

This invention is directed to a support and structural joint between sections of a furnace, and in particular to a fluid cooled support arrangement by means of which the lower furnace walls can be supported from the upper furnace walls.

In once-through steam generators as the fluid is passed upwardly through the tubes of the furnace walls, the temperature of the fluid is increased due to radiation from the combustion taking place within the furnace. However, because of erratic slag patterns on the furnace walls and the unequal distribution of the heat within the furnace, different amounts of heat are picked up in various tubes. Therefore, the temperature of the fluid leaving the furnace wall tubes differs from tube to tube.

In order to reduce the temperature unbalances occurring in the furnace wall tubes, mixing headers have been placed at a location intermediate the top and bottom of the furnace walls. The fluid then leaving the lower section of the furnace wall tubes is mixed in this header so that it enters the upper section with a greatly reduced unbalance thereby decreasing the temperature unbalance at the outlet of the furnace wall.

A large percentage of the heat absorbed in the furnace is absorbed in the lower portion of the furnace in the area of the burners. In order to obtain a good location for the mixing header with respect to the amount of heat picked up, it is desirable to locate this header at a relatively low elevation, down almost as low as the burners. In these areas, however, the heat absorption rate in the furnace walls is quite high. Therefore, structural members which form a portion of the furnace wall cannot be so designed that there is much distance between any portion of an uncooled fin or plate member, and a fluid cooled member to which they are welded.

All large steam generators are of the top supported design. Building steel supported on the ground is erected so that it passes above the steam generator, with the steam generator being supported from this building steel. In these steam generators, which have vertical furnace wall tubes lining the walls of the furnace, the load of the lower portions of the furnace structure, including burners, insulation, casing, etc. is carried by these vertical tubes. Thus, in a unit utilizing a mixing header part way up the furnace walls, the joining structure or support arrangement between the upper and lower furnace wall portions must not only be capable of being exposed to extremely high temperatures, but must also be able to support extremely heavy weights.

It is an object of our invention to support the lower furnace walls from the upper furnace walls by means of a fluid cooled support arrangement therebetween that can be easily and readily assembled, and that will require very little maintenance once installed, in spite of the fact that it is exposed to extremely high furnace temperatures.

Other objects will become apparent to those skilled in the art from the following description when taken in conjunction with the accompanying drawings, wherein.

Figure 1:
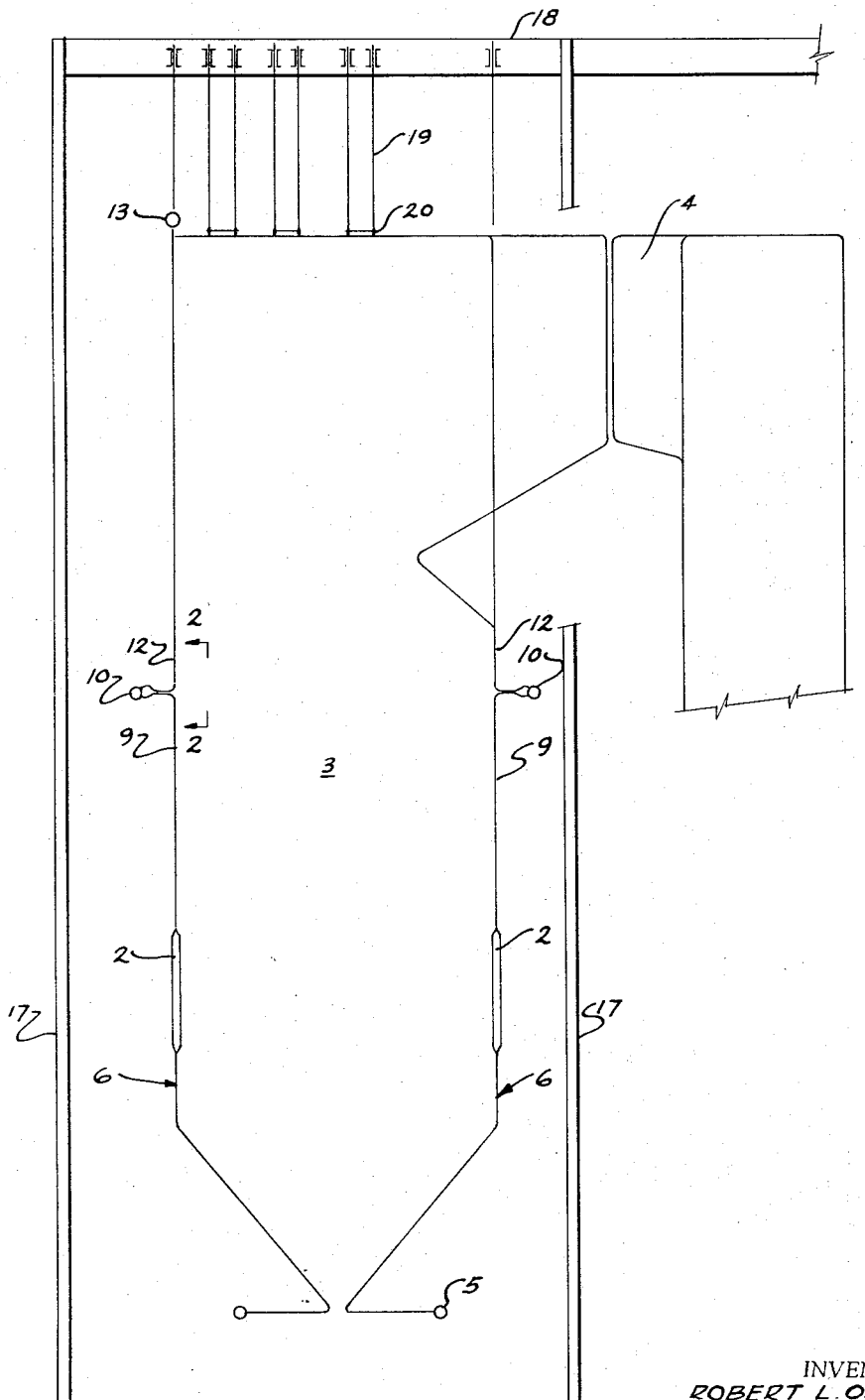
FIGURE 1 is a side elevation of a steam generator having furnace wall mixing headers and incorporating the novel support arrangement.

Looking now to FIGURE 1, fuel is introduced through burners 2 into the furnace 3 where combustion takes place with the products of combustion passing outwardly from the furnace through gas pass 4. Feedwater to the steam generator passes from the economizer (not shown) to the furnace wall inlet headers 5. It passes upwardly through tubes 6 lining the walls of the furnace 3. These tubes are 1¼ inches outside diameter and have a web 11 (FIGURES 2 and 3) which is approximately ¼ inch thick and ½ inch wide, intermediate and welded to the adjacent tubes.

The tubes pass from the lower wall tube portion 9 and are bent outwardly to the mixing header 10. Tubes for the upper wall tube portion 12 extend from the header 10 and pass upwardly along the furnace walls to the outlet header 13. The steam passes from the outlet header 13 to the superheater (not shown), and then to a turbine (not shown) used for the generation of electricity.

The building steel verticals 17 support building steel horizontals 18, from which the steam generator is supported. Tie rods 19 support the upper furnace walls through lugs 20 from the horizontal building steel 18. These lugs 20 are securely welded to the furnace wall tubes, with the weight of the steam generator structure then being carried on these tubes.

Figure 3:
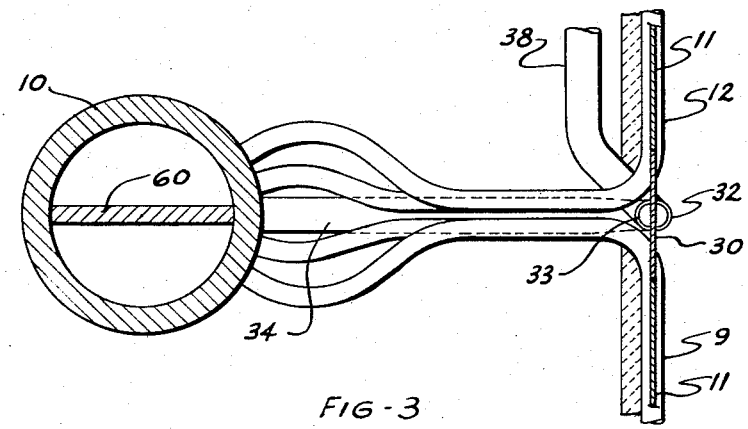
FIGURE 3 is a sectional side view taken on line 3—3 of FIGURE 2.
Figure 2:
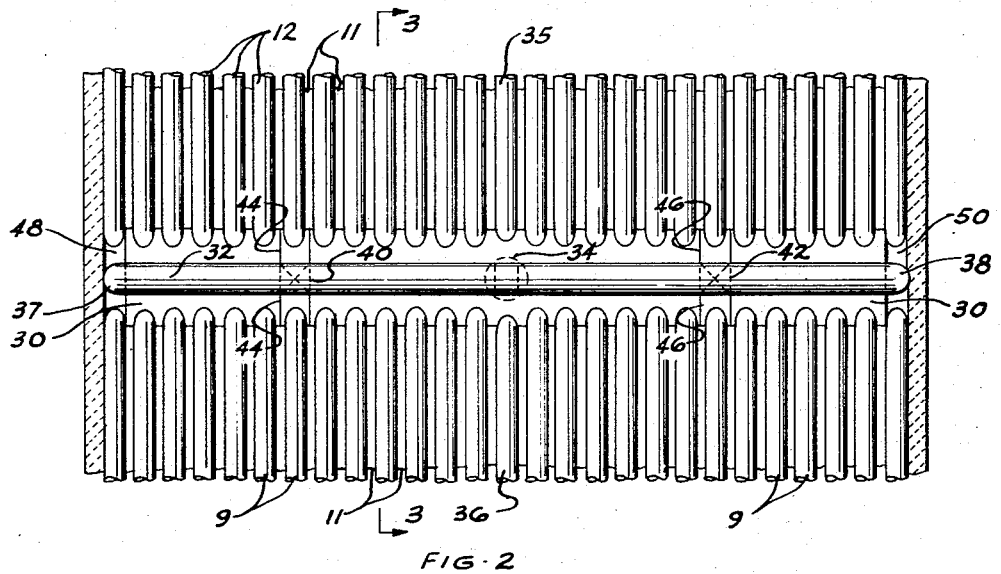
FIGURE 2 is an enlarged front elevation taken on line 2—2 of FIGURE 1.

FIGURES 2 and 3 show the details of the furnace wall arrangement in the area of the mixing header 10. As shown in FIGURE 3, the lower portion tubes 9 are bent outwardly from the plane of the furnace wall, and are fluidly connected to the lower portion of mixing header 10. The upper tube portions 12 are also bent outwardly, and are connected to the upper portion of header 10. Member 60 is a partial plate within header 10, to insure mixing of the fluid in the lower half of mixing header 10.

A support plate 30, which is scalloped along its upper and lower edges, is welded to the bent portion of upper tubes 12 and fin members 11, and is also welded to the bent portion of lower tubes 9 and their fin members 11, so as to form an imperforate, gas tight wall. Plate 30 is positioned so as to lie along the tube centerlines, as does the fins 11, so that there are no eccentric forces created in supporting the lower portion tubes 9 from the upper tubes 12.

Semi-cylindrical members 32 and 33 are welded to both sides of plate member 30. Fluid enters these passages formed by the semi-cylindrical members 32, 33 and plate member 30 through inlet tube 34, located centrally of the furnace wall, and after flowing in both directions along the furnace wall, leaves through outlets 37 and 38. These tubes 37 and 38 are bent upwardly outside of the furnace wall (FIGURE 3), and are connected to header 13. Obviously, plate member 30 will have to be cut short at these outlet ends, and small plate sections 48 and 50 are welded in place to complete the imperforate wall.

The tubes 35 and 36, which lie directly above and below inlet tube 34 (FIGURE 2) are shortened, and are bent a little above and below, respectively, of the bends of all of the other bent tubes, so as to permit tube 34 to enter at this location. Also, a portion of plate member 30 will have to be omitted at this location, in order to permit fluid to flow into both semi-tubular members 32 and 33.

Obviously, the fluid flowing in passage means 32, which is exposed to the furnace heat, will pick up much more heat than the fluid flowing in passage means 33. In order to reverse this fluid, to bring the cooler fluid into the passage means 32 and vice-versa, helices 40 and 42 are located midway between inlet 34 and outlets 37, 38, respectively. These helices can be formed by utilizing a plate having a 180° twist therein. Small plate sections 44 and 46 are welded in place in these areas, to complete the imperforate furnace wall.

It is desirable to have the fluid flowing in passage means 32 and 33 stay as close to the temperature of the fluid entering the bends of tube portions 12 as possible, so that stresses are not created because of unequal thermal expansion. Helices 40 and 42 help accomplish this. If the furnace wall is of too great a width, more than just two helices can be utilized. Another feature used to hold the temperature down in passage means 32 and 33, is to maintain a high flow rate through these passages. One way to accomplish this is to make the inlet 34 and outlets 37, 38 larger. The high flow rate through passage means 32 and 33 allows the members to remain cooler than they normally would be without such a flow rate.

From the above it can be seen that a fluid cooled support and joint member has been provided that can withstand high heat, and can readily and easily be assembled. Semi-tubular members 32 and 33 can be welded to the plate member 30 in the shops. The field welding of the scalloped upper and lower edges of plate 30 to the fins and tubes should not present any great problems, since these areas are readily accessible to the furnace interior when the unit is being built. Because of the fluid cooling feature of the support, maintenance during operation should be at a minimum.

It should be obvious that the invention could be practiced by utilizing just the single semi-tubular member 32, omitting member 33. However, it is desirable to utilize semi-tubular member 33 also, since this balances the pressure forces on both sides of plate member 30. It also permits the use of helices 40 and 42, so as to allow a reserve supply of cooler fluid to be readily and easily brought into passage means 32 between its inlet and outlet ends.

Having thus described our invention, what we claim is:

1. In a vapor generator, a furnace, a plurality of substantially vertical tubes lining at least one of the walls of said furnace, the wall so lined with tubes having a first lower portion and a second upper portion, each lower portion tube and each upper portion tube having an inlet end and an outlet end, a mixing header positioned outside of the furnace wall, the outlet end of each lower portion tube and the inlet end of each upper portion tube being bent outwardly from the furnace wall and fluidly connected to the mixing header, support means securing the bends of the upper portion tubes to the bends of the lower portion tubes, in such a manner that the lower portion tubes are supported by the upper portion tubes, said support means including flow means having an inlet means and an outlet means through which a cooling medium can flow, and the inlet means of the flow means is connected to a source of cooling medium which is at substantially the same temperature as the fluid flowing out of the mixing header.

2. The combination set forth in claim 1, wherein the flow means includes a plate member having an upper edge and a lower edge, which edges are welded to the bends of the upper and lower portion tubes, respectively, and a pair of semi-cylindrical members welded to the plate member, one being welded to each side, thereby forming flow passages on either side of the plate member.

3. The combination set forth in claim 2, wherein means are provided for causing the cooling medium in one of the flow passages to flow over into the other flow passage, and vice versa.

4. The combination as set forth in claim 3, wherein the inlet means of the flow means enters the furnace wall at a central location, and the outlet means includes a pair of outlets, one of which is located at one end of the furnace wall, and the other of which is located at the other end of the wall.

5. The combination set forth in claim 4, wherein the portion of the flow means extending from the mixing header to the furnace wall forms a flow passage which is substantially larger than the flow passage in the remaining portion of the flow means.

6. The combination set forth in claim 1, wherein the flow means includes a plate member having an upper edge and a lower edge, which edges are welded to the bends of the upper and lower portion tubes, respectively, enclosing means welded to the plate member on the furnace interior side thereof, such that the enclosing means in conjunction with a portion of the plate member forms an enclosed flow passage, the plate member lying in the same plane as the plane of the furnace wall.

7. The combination set forth in claim 1, wherein there are webs intermediate the adjacent tubes of both the lower portion tubes and the upper portion tubes, the webs being welded to the tubes so as to form a substantially imperforate wall.

References Cited
UNITED STATES PATENTS

| | | | |
|---|---|---|---|
| 3,162,179 | 12/1964 | Strohmeyer | 122—406 |
| 3,280,799 | 10/1966 | Schroedter | 122—510 X |
| 3,307,524 | 3/1967 | Ambrose | 122—510 |
| 3,308,792 | 3/1967 | Lawton | 122—510 |

CHARLES J. MYHRE, *Primary Examiner.*